(12) United States Patent
Tamai et al.

(10) Patent No.: US 7,774,593 B2
(45) Date of Patent: Aug. 10, 2010

(54) ENCRYPTED PACKET, PROCESSING DEVICE, METHOD, PROGRAM, AND PROGRAM RECORDING MEDIUM

(75) Inventors: Masaaki Tamai, Sakurai (JP); Hiroshi Yokota, Suita (JP); Tatsuro Ikoma, Takatsuki (JP)

(73) Assignee: Panasonic Corporation, Osaka (JP)

( * ) Notice: Subject to any disclaimer, the term of this patent is extended or adjusted under 35 U.S.C. 154(b) by 1091 days.

(21) Appl. No.: 10/828,226

(22) Filed: Apr. 21, 2004

(65) Prior Publication Data

US 2004/0215955 A1 Oct. 28, 2004

(30) Foreign Application Priority Data

Apr. 24, 2003 (JP) .............................. 2003-119974

(51) Int. Cl.
H04L 9/00 (2006.01)

(52) U.S. Cl. ........................ 713/150; 713/154; 713/160; 726/1; 726/2; 726/13; 709/207; 709/240; 380/37; 370/497

(58) Field of Classification Search .................... 726/3, 726/13, 1, 2; 713/150, 160, 151; 709/207, 709/232, 238, 240; 380/37; 370/235, 469, 370/497

See application file for complete search history.

(56) References Cited

U.S. PATENT DOCUMENTS

| 6,021,199 | A  | * | 2/2000  | Ishibashi ................. 380/217 |
| 6,701,349 | B1 | * | 3/2004  | Cromer et al. ............ 709/207 |
| 6,996,842 | B2 | * | 2/2006  | Strahm et al. ............. 726/13 |
| 7,000,120 | B1 | * | 2/2006  | Koodli et al. ................ 713/1 |
| 7,003,118 | B1 | * | 2/2006  | Yang et al. ................ 380/287 |
| 7,158,637 | B2 | * | 1/2007  | Ohta et al. .................. 380/37 |
| 7,162,630 | B2 | * | 1/2007  | Sperry et al. ............... 713/153 |
| 7,185,365 | B2 | * | 2/2007  | Tang et al. ................... 726/13 |
| 7,218,736 | B1 | * | 5/2007  | Nishimura et al. .......... 380/201 |
| 7,233,948 | B1 | * | 6/2007  | Shamoon et al. ................ 707/9 |
| 7,292,691 | B2 | * | 11/2007 | Candelore et al. ........... 380/212 |
| 7,385,921 | B2 | * | 6/2008  | Itakura et al. ............... 370/230 |
| 7,434,045 | B1 | * | 10/2008 | Enderwick et al. .......... 713/158 |
| 2002/0083317 | A1 | * | 6/2002 | Ohta et al. .................. 713/161 |
| 2003/0018908 | A1 | * | 1/2003 | Mercer et al. ............... 713/193 |
| 2003/0196081 | A1 | * | 10/2003 | Savarda et al. .............. 713/153 |
| 2004/0139313 | A1 | * | 7/2004 | Buer et al. ................... 713/150 |
| 2004/0184479 | A1 | * | 9/2004 | Yamauchi et al. ........... 370/466 |

FOREIGN PATENT DOCUMENTS

JP 2001-344228 12/2001
JP 2002-182560 6/2002

* cited by examiner

*Primary Examiner*—Nasser Moazzami
*Assistant Examiner*—Shanto M Abedin
(74) *Attorney, Agent, or Firm*—Wenderoth, Lind & Ponack, L.L.P.

(57) ABSTRACT

An encrypted packet processing device capable of realizing a predetermined classification process according to a data type while reducing the burden on a processing device in a communication environment in which encrypted packets of different data types exist. A block specifying section specifies a location, in which information necessary for a priority level determination process by a priority level determination section is stored, in an encrypted packet. A specified block decryption section decrypts only a block specified by the block specifying section, and extracts the information necessary for the priority level determination process. The priority level determination section searches a priority level information database using the information extracted by the specified block decryption section as a key, and determines a priority level of the packet.

15 Claims, 16 Drawing Sheets

FIG. 7

| SPI | PROTOCOL | MODE | ENCRYPTION ALGORITHM | ENCRYPTION KEY | AUTHENTICATION ALGORITHM | AUTHENTICATION KEY |
|---|---|---|---|---|---|---|
| 5000 | ESP | TRANSPORT | DES-CBC | abcdefgh | HMAC-MD5 | QRSTU |
| 6000 | ESP | TRANSPORT | 3DES-CBC | ijklmnop | HMAC-SHA1 | VWXYZ |
| ... | ... | ... | ... | ... | ... | ... |

F I G. 8

| NUMBER | IP HEADER | | LAYER 4 HEADER | | | PRIORITY LEVEL |
|---|---|---|---|---|---|---|
| | SOURCE IP ADDRESS | DESTINATION IP ADDRESS | PROTOCOL TYPE | SOURCE PORT NUMBER | DESTINATION PORT NUMBER | |
| 1 | 132.182.1.2 | 132.182.2.2 | UDP | 1000 | * | 1 |
| 2 | 132.182.1.2 | 132.182.2.2 | UDP | 1001 | * | 2 |
| 3 | 132.182.1.2 | 132.182.2.2 | TCP | 1000 | * | 2 |
| ... | ... | ... | ... | ... | ... | ... |

FIG. 14

| NUMBER | IP HEADER | | IP HEADER (INNER) | | LAYER 4 HEADER | | | PRIORITY LEVEL |
|---|---|---|---|---|---|---|---|---|
| | SOURCE IP ADDRESS | DESTINATION IP ADDRESS | SOURCE IP ADDRESS | DESTINATION IP ADDRESS | PROTOCOL TYPE | SOURCE PORT NUMBER | DESTINATION PORT NUMBER | |
| 1 | 132.182.1.2 | 132.182.2.2 | 192.168.1.* | 192.168.2.* | UDP | 1000 | * | 1 |
| 2 | 132.182.1.2 | 132.182.2.2 | 192.168.1.* | 192.168.2.* | UDP | 1001 | * | 2 |
| 3 | 132.182.1.2 | 132.182.2.2 | 192.168.1.* | 192.168.2.* | TCP | 1000 | * | 2 |
| ... | ... | ... | ... | ... | ... | ... | ... | ... |

ENCRYPTED PACKET, PROCESSING DEVICE, METHOD, PROGRAM, AND PROGRAM RECORDING MEDIUM

BACKGROUND OF THE INVENTION

1. Field of the Invention

The present invention relates to encrypted packet processing devices, methods, programs, and program storing media. More particularly, the present invention relates to an encrypted packet processing device and an encrypted packet processing method for performing a predetermined classification process by determining a type of an encrypted packet, and a computer program and a program recording medium for executing the method.

2. Description of the Background Art

In recent years, due to the improvement of the environment for the Internet, a server device and a user terminal device can easily communicate various types of data via the Internet. The above data falls into the following two broad categories: data requiring no real-time processing, such as an application program and an electronic mail (hereinafter, referred to as non real-time data); and data requiring real-time processing, such as video and audio (hereinafter, referred to as real-time data). In the case where the above-described two types of data are processed all together, there is a possibility that video/audio may be stopped or lost, for example, if processing of real-time data is delayed. Therefore, the user terminal device, etc., preferably classifies input data into real-time data and non real-time data, and processes the real-time data preferentially over the non real-time data. In general, the above classification process is performed based on specific information indicating a data type, etc.

On the other hand, in conjunction with the spread of easy communications of various data between the server device and the user terminal device, there is a growing need for private line levels of security in the electronic commerce and electronic payment fields, for example, where information of special importance or information related to individual privacy is communicated. There exist various types of methods for providing high levels of security (e.g., see Japanese Patent Laid-Open Publication No. 2002-182560 and Japanese Patent Laid-Open Publication No. 2001-344228), of which IPsec (Internet Protocol Security) technology can be taken as one example of a typical method for providing high levels of security.

The IPsec is a security protocol performing encryption and authentication in a network layer (a third layer of an OSI reference model), and is standardized by Internet Engineering Task Force (IETF). By connecting a user terminal device installed with the IPsec function to the Internet, or connecting a user terminal device to the Internet via a network connecting device (e.g., a modem or a router) installed with the IPsec function, it is possible to establish a virtual private network (VPN) on a wide area network such as the Internet. That is, a user can use the Internet safely without the need for performing special processing such as encryption.

In order to perform communication using IPsec, it is necessary to cause the transmitting and receiving end devices installed with the IPsec function to previously agree on which information, such as an encryption algorithm, an authentication algorithm, an encryption key, and an authentication key, is used for communication. The above-described information is referred to as security parameters, including an encryption algorithm, an encryption key, an authentication algorithm, an authentication key, a Security Parameter Index (SPI) value, a protocol (e.g., ESP for encryption, and AH for authentication), and a mode (transport or tunnel), or the like. In general, in order to cause the transmitting and receiving end devices to agree on which security parameters to use, communication is performed between the devices by an application called Internet Key Exchange (IKE). The security parameters, which are agreed on by the transmitting and receiving end devices to use after communicating with each other, are kept as a set of security related information called Security Association (SA), and are notified to an IPsec processing section in each device. Based on the encryption algorithm, the authentication algorithm, the encryption key, and the authentication key, etc., defined by SA, the IPsec processing section converts an IP packet to be transmitted into an IPsec packet, and restores a received IPsec packet to the original IP packet.

IPsec can be run in transport mode and tunnel mode. In transport mode, as shown in FIG. 16, a protocol header and data of a fourth or higher level layer such as transmission control protocol (TCP) or user diagram protocol (UDP) (higher than an IP protocol), which are included in a packet to be encrypted, are encrypted. Also, in tunnel mode, as shown in FIG. 17, the entire IP packet to be encrypted is encrypted, and is encapsulated by a new IP packet. Thus, in tunnel mode, the entire portion of the original IP packet (including a protocol header and data of a fourth or higher level layer) is encrypted.

Here, a case in which the above-described classification process is performed for an IP packet encrypted in either transport or tunnel mode (i.e., an IPsec packet) will be described. In this case, specific information necessary for determination of a data type corresponds to the encrypted protocol header and data. Thus, in order to determine a data type, it is necessary to decrypt the entire IPsec packet. Hereinafter, a conventional device for classifying the IPsec packet based on the data type, and performing priority processing in accordance with the classification will be described. FIG. 18 is a block diagram showing an exemplary structure of a conventional processing device 200.

In FIG. 18, the conventional processing device 200 includes an input processing section 201, an encryption determination section 202, a decryption processing section 203, a security association database (SAD) 204, a priority level determination section 205, a priority level information DB 206, and an output processing section 207. The SAD 204 is a database in which information about various SA security parameters is stored. The priority level information DB 206 is a database in which a set of specific information and a previously-determined priority level is stored.

The input processing section 201, which is, for example, a network interface, inputs an incoming IP packet. The encryption determination section 202 refers to header information of the IP packet input by the input processing section 201, and determines whether or not the IP packet is encrypted, that is, whether or not the input packet is an IPsec packet. The decryption processing section 203 extracts, from the header information, SA information about encryption performed for the IPsec packet determined by the encryption determination section 202. Next, the decryption processing section 203 searches the SAD 204 using the extracted information as a key, and obtains security parameters corresponding to the extracted information. Based on the obtained security parameters, the decryption processing section 203 decrypts all encryption performed for the IPsec packet. The priority level determination section 205 checks a type of the IPsec packet in accordance with the specific information included in the IPsec packet decrypted by the decryption processing section 203, and determines a classification (i.e., a priority level) of the IPsec packet by searching the priority level information DB 206 using the type as a key. The output processing section 207 executes a predetermined output process in accordance with the priority level determined by the priority level determination section 205. For example, the output processing section 207 may be composed of a plurality of processing queues provided for each priority level, thereby changing a processing queue used for queuing in accordance with the determined priority level.

By the above-described process, priority processing based on the data type can be realized even in a communication environment in which an encrypted real-time data packet exists in conjunction with an encrypted non real-time data packet.

In general, packet encryption and decryption require a lot of processing time. Thus, in the above-described conventional device employing a method of decrypting all encryption performed for a packet, a processing device has to spend a lot of time in processing. As a result, there arises a problem that packet processing may be delayed, for example, if encrypted packets arrive consecutively. Such processing delay renders priority processing meaningless.

SUMMARY OF THE INVENTION

Therefore, an object of the present invention is to provide an encrypted packet processing device, method, and program, and a program recording medium capable of realizing a predetermined classification process according to a data type while reducing the burden on a processing device in a communication environment in which encrypted packets of different data types exist.

The present invention has the following features to attain the object mentioned above.

The present invention is directed to an encrypted packet processing device performing a predetermined classification process for a packet including at least a portion of data encrypted on a block basis. In order to attain the object mentioned above, the encrypted packet processing device of the present invention includes a block specifying section, a specified block decryption section, and a classification processing section.

The block specifying section specifies one or more encrypted blocks, which include specific information necessary for the predetermined classification process, of an input packet. The specified block decryption section decrypts the encrypted block specified by the block specifying section. The classification processing section performs classification for the input packet based on the specific information included in the block decrypted by the specified block decryption section.

The block specifying section may specify a portion or an entirety of the encrypted block including specific information necessary for the predetermined classification process based on information included in an unencrypted block of the input packet. For example, in the case where the input packet is a packet encrypted in accordance with an IPsec protocol, it is possible to use a protocol number included in an IP header as information included in the unencrypted block.

Alternatively, the block specifying section may specify another encrypted block including information for specifying the encrypted block including specific information necessary for the predetermined classification process, thereby specifying a portion or an entirety of the encrypted block including specific information necessary for the predetermined classification process based on the information included in the other block decrypted by the specified block decryption section. For example, in the case where the input packet is a packet encrypted in accordance with an IPsec protocol, it is possible to use at least one of an IP header length, a service type, and a protocol number, which are included in an IP header, as the information for specifying the encrypted block including the specific information. Also, in the case where the input packet is an ESP transport mode packet encrypted, it is possible to use at least one of a next header included in an encapsulated security payload (ESP) trailer, a source port number included in a layer 4 header, and a destination port number included in the layer 4 header as the specific information necessary for the predetermined classification process. Also, in the case where the input packet is an ESP tunnel mode packet encrypted, it is possible to use at least one of a source IP address, a destination IP address, a service type, and a protocol number, which are included in an encapsulated IP header, a source port number included in a layer 4 header, and a destination port number included in the layer 4 header as the specific information necessary for the predetermined classification process.

Alternatively, if a database for storing information about a correspondence between encryption applicable to a packet and the encrypted block including specific information necessary for the predetermined classification process is previously included, it is possible to cause the block specifying section to specify a portion or an entirety of the encrypted block including specific information necessary for the predetermined classification process based on encryption applied to the input packet and the information stored in the database. Here, in the case where the input packet is a packet encrypted in accordance with an IPsec protocol, the database may be a security association database (SAD) storing security parameters including an encryption key.

As a typical classification processing section, the classification processing section may include a priority level information database for storing information about a correspondence between specific information and a priority level, and a priority level determination section for determining a priority level of the input packet based on the specific information included in the decrypted block and the information stored in the priority level information database.

Alternatively, as a classification processing section with another structure, the classification processing section may include a distribution destination information database for storing information about a correspondence between specific information and a distribution destination. The classification processing section may also include a distribution destination determining section for determining a distribution destination of the input packet based on the specific information included in the decrypted block and the information stored in the distribution destination information database.

If the above-described structure further includes a plurality of queues, each of which has a uniquely corresponding priority level or distribution destination, and a decryption processing section for sequentially extracting a packet from the plurality of queues and performing a decryption process based on a predetermined rule, or a distribution processing section for extracting a packet from the plurality of queues and sending the extracted packet to a distribution destination, it is possible to cause the priority level determination section or the distribution destination determining section to enqueue the input packet in the queue corresponding to the determined priority level or distribution destination.

In this case, the priority determination section or the distribution destination determining section preferably enqueues the input packet and the block decrypted by the specified block decryption section in the queue corresponding to the determined priority level or distribution destination, and the decryption processing section preferably performs a decryption process for a block, which is included in the input packet, other than the decrypted block, or the distribution processing section preferably sends the decrypted block in conjunction with the input packet to the distribution destination.

Also, the present invention is directed to an encrypted packet processing method performing a predetermined classification process for a packet including at least a portion of data encrypted on a block basis. In order to attain the object mentioned above, the encrypted packet processing method includes a block specifying step of specifying one or more encrypted blocks, which include specific information necessary for the predetermined classification process, of an input packet, a specified block decryption step of decrypting the encrypted block specified in the block specifying step, and a classification processing step of performing classification for the input packet based on the specific information included in the block decrypted in the specified block decryption step.

The functional blocks comprising the above-described encrypted packet processing device may be realized as an LSI. Also, the encrypted packet processing method is supplied as a program for causing a computer to execute a series of procedures. The program may be installed into the computer as being stored in a computer readable recording medium.

As such, based on the present invention, when a packet classification process is performed, a location (block), in which specific information necessary for a classification process is stored, in an encrypted packet is specified, and only data at the location (block) is decrypted. As a result, it is possible to minimize the burden on a device performing a decryption process, thereby improving efficiency of priority processing and a distribution process to be performed in the following stage. Also, even if a location of the specific information changes from one packet to another, it can be specified by specifying and decrypting another encrypted block which indicates the location of the specific information.

These and other objects, features, aspects and advantages of the present invention will become more apparent from the following detailed description of the present invention when taken in conjunction with the accompanying drawings.

BRIEF DESCRIPTION OF THE DRAWINGS

FIG. 7 is an illustration showing an exemplary SAD;

FIG. 8 is an illustration showing one example of a priority level information DB (transport mode);

FIG. 14 is an illustration showing one example of a priority level information DB (tunnel mode);

DETAILED DESCRIPTION OF THE INVENTION

An encrypted packet processing device and method of the present invention can be applied to various types of systems using a security protocol for encrypting information (hereinafter, referred to as specific information) necessary for a predetermined classification process among information included in a packet for packet transfer communication. In the following embodiments, the encrypted packet processing device and method of the present invention will be described by taking a system using an IPsec security protocol described in the Description of the Background Art section for example.

(1) transport Mode IPsec

Figure 1:
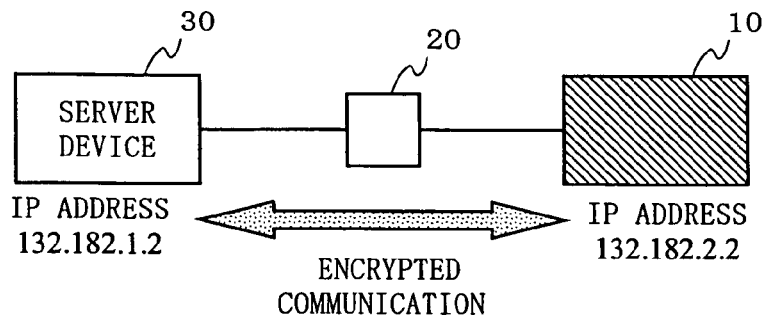
FIG. 1 is an illustration showing an exemplary network structure of an encrypted communication system (transport mode) including an encrypted packet processing device according to a first embodiment of the present invention.

FIG. 1 is an illustration showing an exemplary network structure of an encrypted communication system including an encrypted packet processing device according to a first embodiment of the present invention. In FIG. 1, the encrypted communication system is composed of an encrypted packet processing system 10, a network connecting device 20, and a server device 30. The encrypted packet processing device 10 is the feature of the present invention. The encrypted packet processing device 10 may be installed into a user terminal device such as a personal computer, or may be provided as an intermediary device separately from the user terminal device. The network connecting device 20, which is a modem or a router, etc., may be provided as a single unit as shown in FIG. 1, or may be united with the encrypted packet processing device 10. The server device 30 encrypts a packet including real-time data such as video and audio and a packet including non real-time data such as an electronic mail, and transmits the encrypted packet.

An SA is previously established between the encrypted packet processing device 10 and the server device 30, and communication is performed using IPsec. Hereinafter, assume that an IP address of the encrypted packet processing device 10 is "132.182.2.2" and an IP address of the server device 30 is "132.182.1.2". Also, assume that the SA established between the encrypted packet processing device 10 and the server device 30 is described as "SA1", and the SA1 includes the following information: a protocol "ESP", a mode "transport", an encryption algorithm "DES-CBC", and an authentication algorithm "HMAC-MD5". Thus, a packet transmitted by the server device 30 to the encrypted packet processing device 10 via the network connecting device 20 is an IPsec packet generated by encrypting an IP packet in ESP transport mode.

Before describing the encrypted packet processing device 10 of the present invention, various types of packet structures and protocol formats will be described first.

Figure 16:
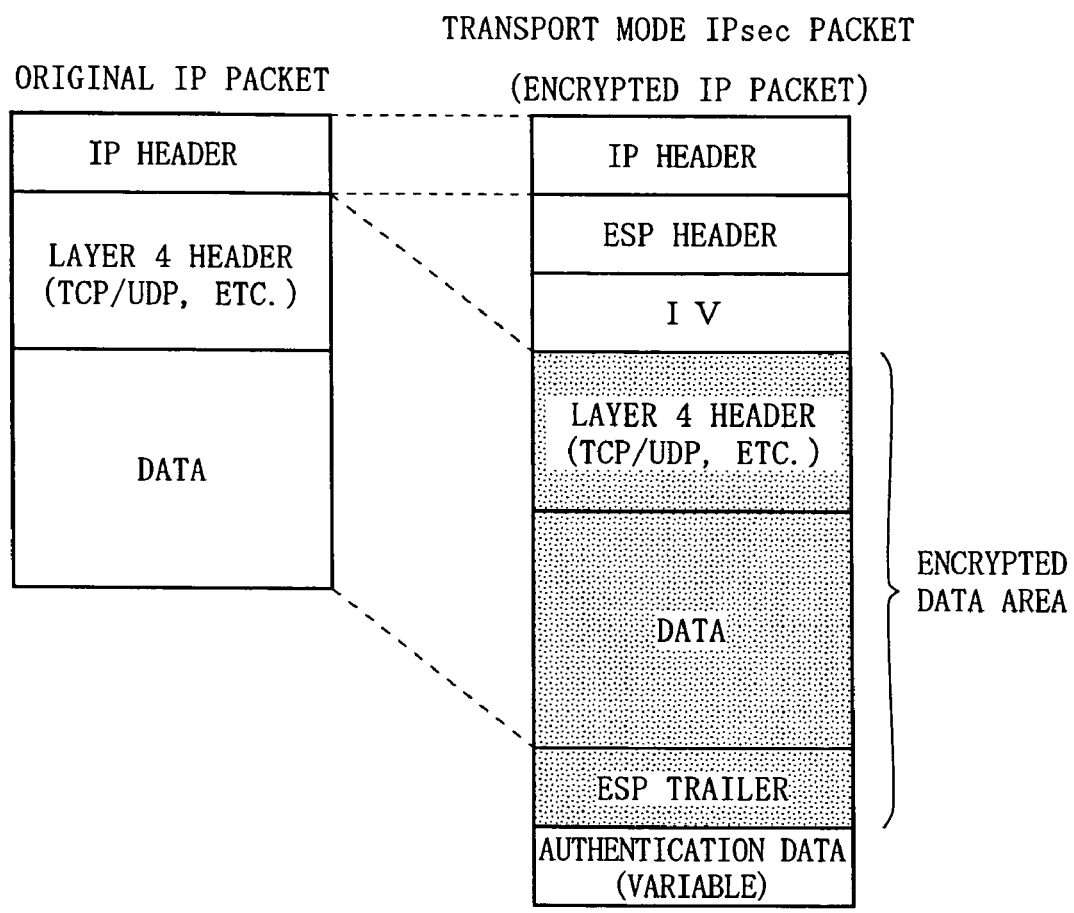
FIG. 16 is an illustration showing the structure of a transport mode IPsec packet.

The structure of the IPsec packet in ESP transport mode is shown in FIG. 16. The IPsec packet is composed of an IP header, an ESP (Encapsulated Security Payload) header, an IV (Initialization Vector), a layer 4 header, data, an ESP trailer, and authentication data.

Figure 2:
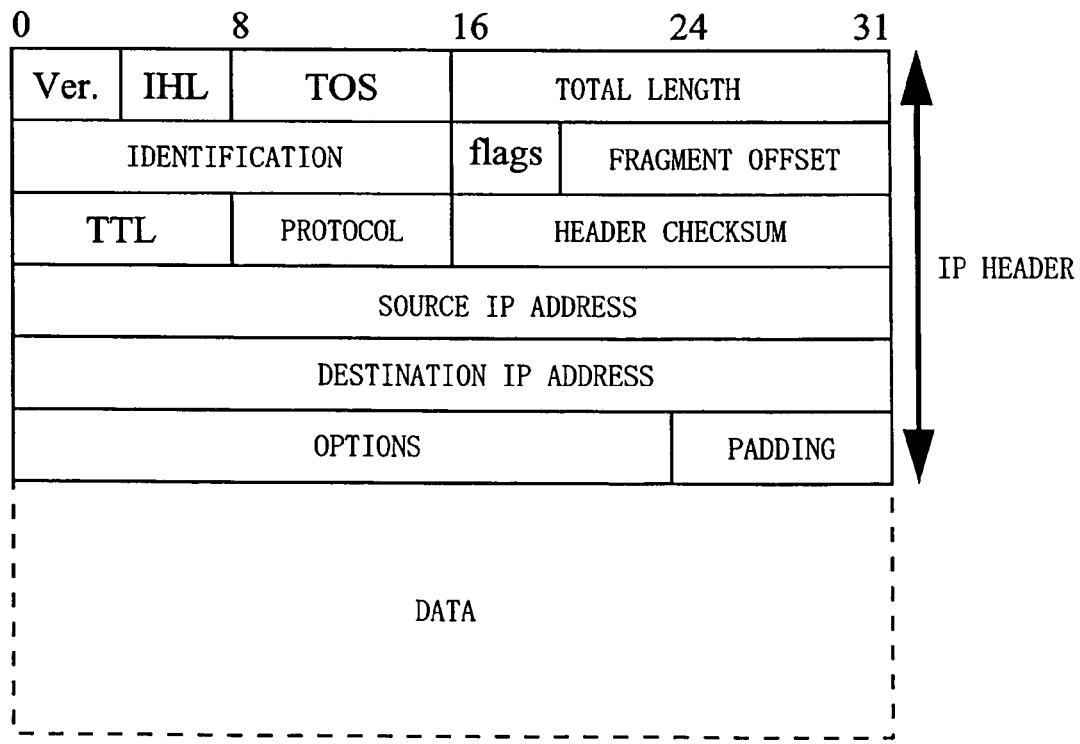
FIG. 2 is an illustration showing the structure of an IP header.

As an IP header of the IPsec packet, an IP header of a pre-encrypted IP packet is used as it is. The structure of the IP header is shown in FIG. 2. In this structure, the present invention uses a protocol field, a source IP address field, and a destination IP address field. A number of a protocol placed at the head of a packet data area following the IP header is stored in the protocol field. In the pre-encrypted IP packet, the IP header is followed by a layer 4 header (in FIG. 16, see figure on the left), whereby a number indicating a layer 4 protocol is stored in the protocol field. In the IPsec packet in ESP transport mode, the IP header is followed by an ESP header (in FIG. 16, see figure on the right), whereby a number indicating an ESP protocol is stored in the protocol field. Thus, it is possible to immediately determine whether the transmitted packet is an encrypted IPsec packet or an unencrypted IP packet by checking a number of the protocol field.

Figure 3:
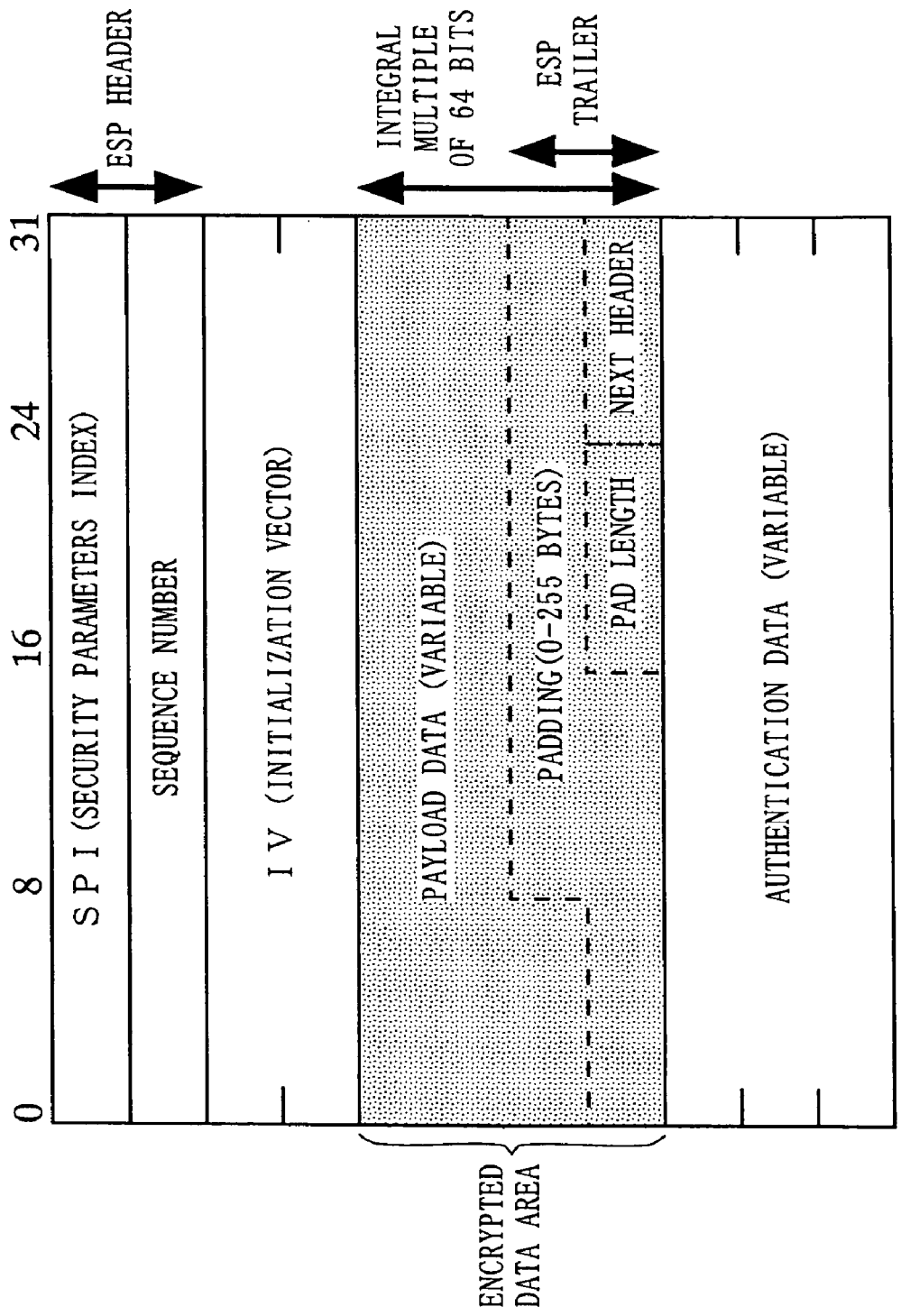
FIG. 3 is an illustration showing a format of an encapsulating security payload (ESP) protocol.

FIG. 3 is an illustration showing a format of the ESP protocol following the IP header. In FIG. 3, a stateful packet inspection (SPI) and a sequence number correspond to the ESP header. The IV is an initialization vector for performing block encryption for data. In the payload data, a layer 4 header and data of the pre-encrypted IP packet are encrypted and stored. An area from padding, which is used for adjusting a length of a payload portion, to a next header corresponds to the ESP trailer. In the next header field, a number of a protocol placed at the head of the payload data is stored. For example, if a layer 4 protocol of the pre-encrypted IP packet is UDP, a number indicating UDP is stored in the next header field. On the other hand, if a layer 4 protocol of the pre-encrypted IP packet is TCP, a number indicating TCP is stored in the next header field. As is the case with the payload data, the above-described ESP trailer is encrypted. Authentication data is data for an area from the ESP header to the ESP trailer. In this format, the SPI, the IV, a portion of the payload data, and the next header are used in the present invention, and the portion of the payload data and the next header correspond to specific information.

Figure 4:
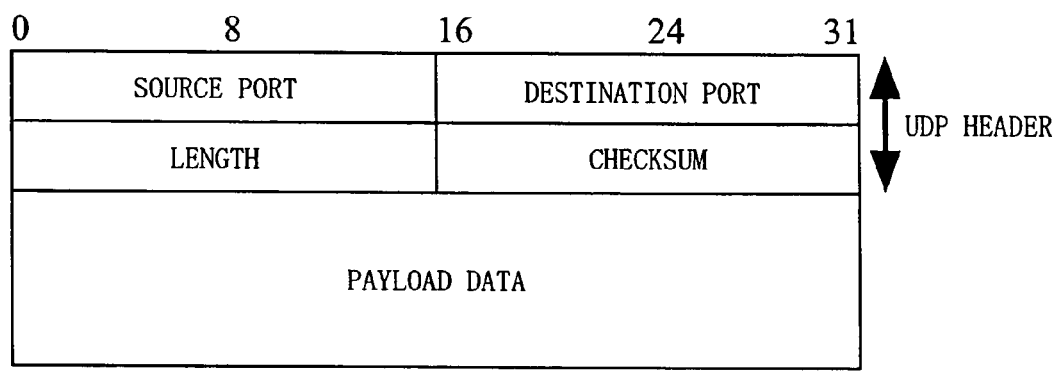
FIG. 4 is an illustration showing a format of a user diagram protocol (UDP) packet.
Figure 5:
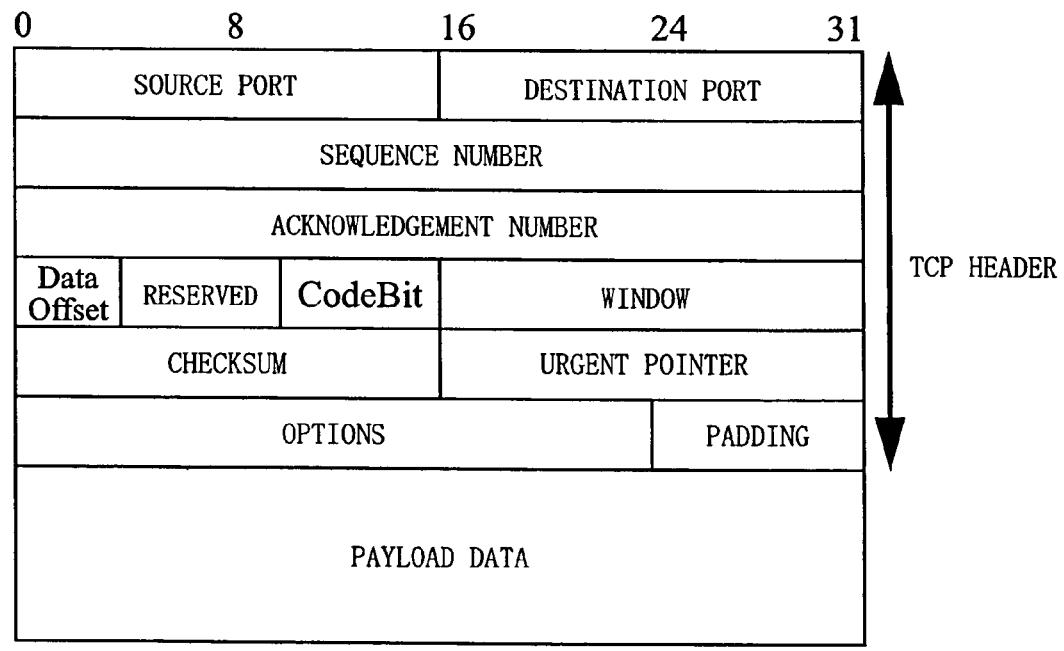
FIG. 5 is an illustration showing a format of a transmission control protocol (TCP) packet.

A format of a packet to be stored in the payload data as shown in FIG. 3 will be described. FIG. 4 is an illustration showing a format of a UDP packet. The UDP packet is composed of a UDP header and payload data. The UDP header has a fixed length of 8 bytes. A source port number and a destination port number are stored in the first four bytes of the UDP header, and a length and a checksum are stored in the next four bytes of the UDP header. FIG. 5 is an illustration showing a format of a TCP packet. The TCP packet is composed of a TCP header and payload data. The TCP header has a fixed length of 24 bytes. A source port number and a destination port number are stored in the first four bytes of the TCP header, and data as shown in FIG. 5 is stored in the remaining 20 bytes of the TCP header. In this format, the source port number and the destination port number (the above-described portion of the payload data) correspond to specific information.

Figure 6:
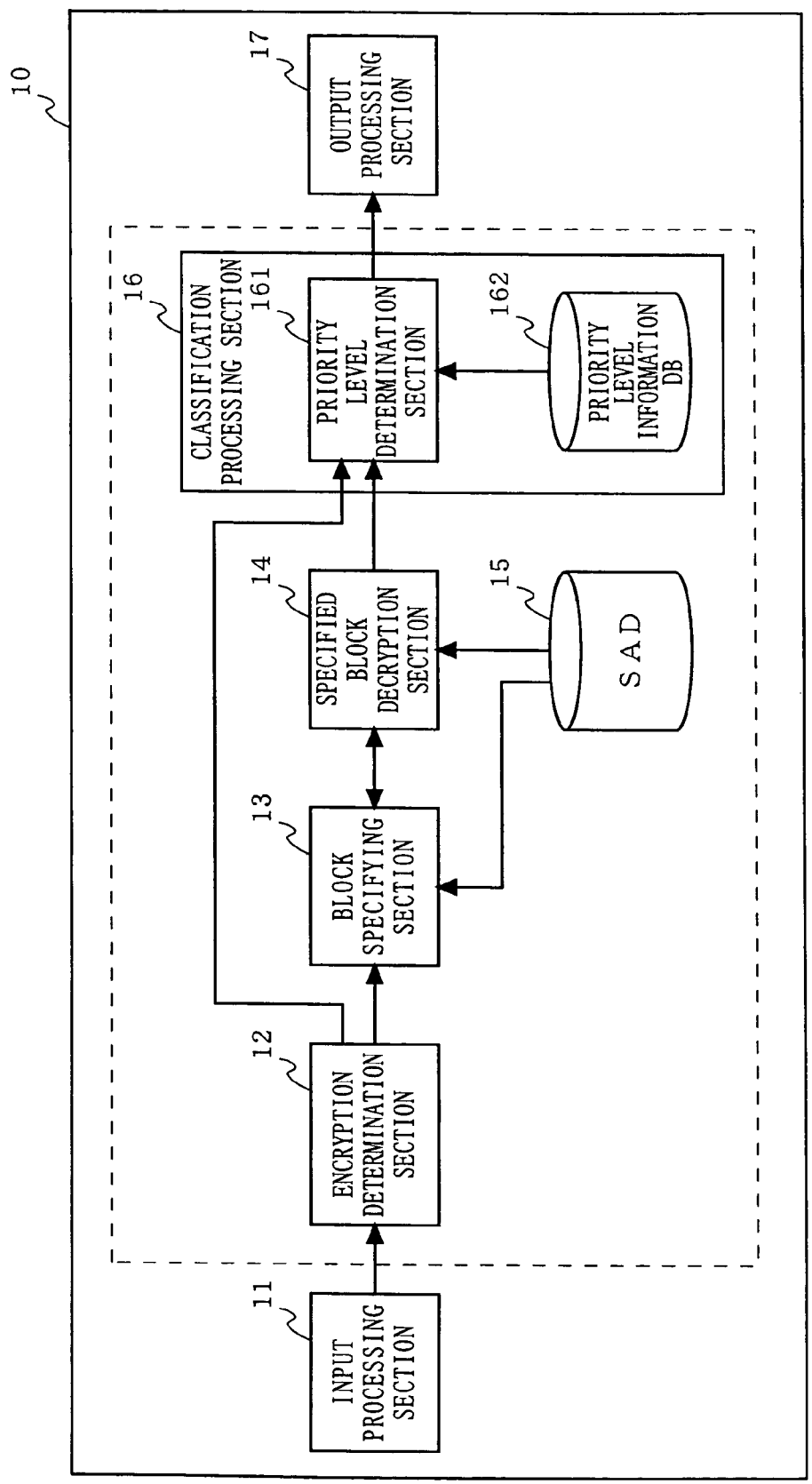
FIG. 6 is a block diagram showing the structure of the encrypted packet processing device according to the first embodiment of the present invention.

Next, the structure of the encrypted packet processing device 10 of the present invention will be described. FIG. 6 is a block diagram showing the structure of the encrypted packet processing device 10 according to the first embodiment of the present invention. In FIG. 6, the encrypted packet processing device 10 includes an input processing section 11, an encryption determination section 12, a block specifying section 13, a specified block decryption section 14, a SAD 15, a classification processing section 16, and an output processing section 17. The classification processing section 16 classifies an input packet according to the packet type, and this classification can be applied to various objectives. In the first embodiment, a case in which the classification processing section 16 is composed of a priority level determination section 161 and a priority level information DB 162, and the classification results is used for priority processing will be described. Also, in FIG. 6, the input processing section 11 and the output processing section 17 are included in the structure of the encrypted packet processing device 10, but these elements are not necessarily required in the encrypted packet processing device 10. For example, the input processing section 11 and the output processing section 17 may be included in a device connected to a previous or following stage of the encrypted packet processing device 10.

The SAD 15 is a database in which information about security parameters of various SAs is stored. FIG. 7 is an illustration showing one example of the SAD 15.

In the SAD 15, security parameters such as an SPI value, a protocol, a mode, an encryption algorithm, an encryption key, an authentication algorithm, and an authentication key, etc., are registered for each SA established between the encrypted packet processing device and the server. In FIG. 7, the above-described SA1 established between the encrypted packet processing device 10 and the server device 30 is registered as a first record whose SPI value is "5000". The database stored in the SAD 15 can be searched using the SPI value as a key.

The priority level information DB 162 is a database in which a set of specific information and a previously-determined priority level is stored. FIG. 8 is an illustration showing one example of the priority level information DB 162.

In the priority level information DB 162, a plurality of entries each containing IP header information, layer 4 header information, and a priority level, etc., are registered. The IP header information is composed of a source IP address, which is an IP address of the server device, and a destination IP address, which is an IP address of its own (i.e., IP address of the encrypted packet processing device). The layer 4 information is composed of a protocol type, a source port number, and a destination port number. Arbitrary information can be entered in a column indicated by a symbol "*" in FIG. 8. The priority level is information used for determining, for example, the order in which a process is performed by the output processing section 17. The above-described priority level is synonymous with a classification number, and its value can be arbitrarily set in accordance with a purpose of processing.

Next, an operation of the encrypted packet processing device 10 of the present invention will be described.

In the first embodiment, a case in which the server device 30 transmits three types of packets A1 to A3, which will be described below, encryption according to the SA1 will be described. The packet A1, whose source port number and destination port number are respectively set to "1000" and "2000", is an IPsec packet including a UDP packet in which real-time data is stored. The packet A2, whose source port number and destination port number are respectively set to "1001" and "2000", is an IPsec packet including a UDP packet in which non real-time data is stored. The packet A3, whose source port number and destination port number are respectively set to "1000" and "2000", is an IPsec packet including a TCP packet in which non real-time data is stored. The SPI value of the ESP header of each of the packets A1 to A3 is set to "5000".

Figure 9:
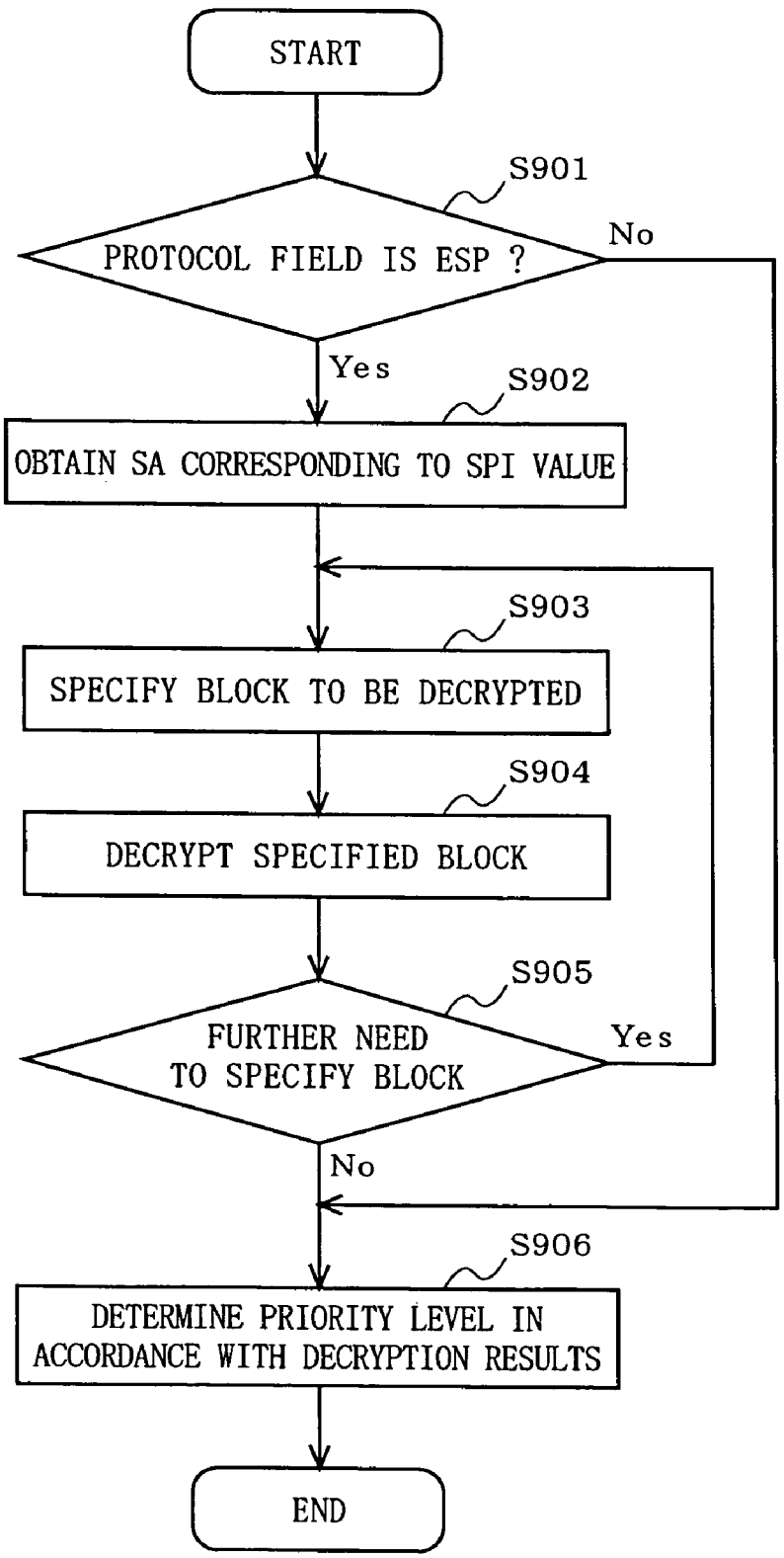
FIG. 9 is a flowchart showing a procedure of an encrypted packet processing method performed by the encrypted packet processing device according to the first embodiment of the present invention.

FIG. 9 is a flowchart showing a procedure of an encrypted packet processing method performed by the encrypted packet processing device 10 of the present invention.

The input processing section 11, which is, for example, a network interface, inputs an incoming packet. The encryption determination section 12 refers to the protocol field (FIG. 2) of the packet input by the input processing section 11, and determines whether or not the packet is encrypted (step S901). Specifically, the encryption determination section 12 determines whether the protocol field stores an ESP protocol number indicating that the packet is an IPsec packet encrypted by IPsec, or stores a layer 4 protocol number indicating that the packet is an unencrypted IP packet. If the protocol field stores an ESP protocol number, the encryption determination section 12 outputs the packet (IPsec packet) to the block specifying section 13. Otherwise, the encryption determination section 12 outputs the packet (IP packet) to the priority level determination section 161.

The block specifying section 13 extracts the SPI value in the ESP header (FIG. 3) of the IPsec packet determined by the encryption determination section 12, and obtains the security parameters of the SA used for the IPsec packet by searching the SAD 15 (FIG. 7) using the extracted SPI value as a key (step S902). For example, in the case where the SPI value is "5000", the block specifying section 13 obtains the security parameters corresponding to the SPI value "5000" from the SAD 15, that is, the security parameters of SA1 (an encryption algorithm "DES-CBC", an encryption key "abcdefgh", an authentication algorithm "HMAC-MD5", and an authentication key "QRSTU", etc.). Based on the obtained security parameters, the block specifying section 13 specifies a location, in which information necessary for a priority level determination process by the priority level determination section 161 is stored, from among encrypted data (step S903). In the first embodiment, the layer 4 protocol type, the source port number, and the destination port number are necessary.

Figure 10:
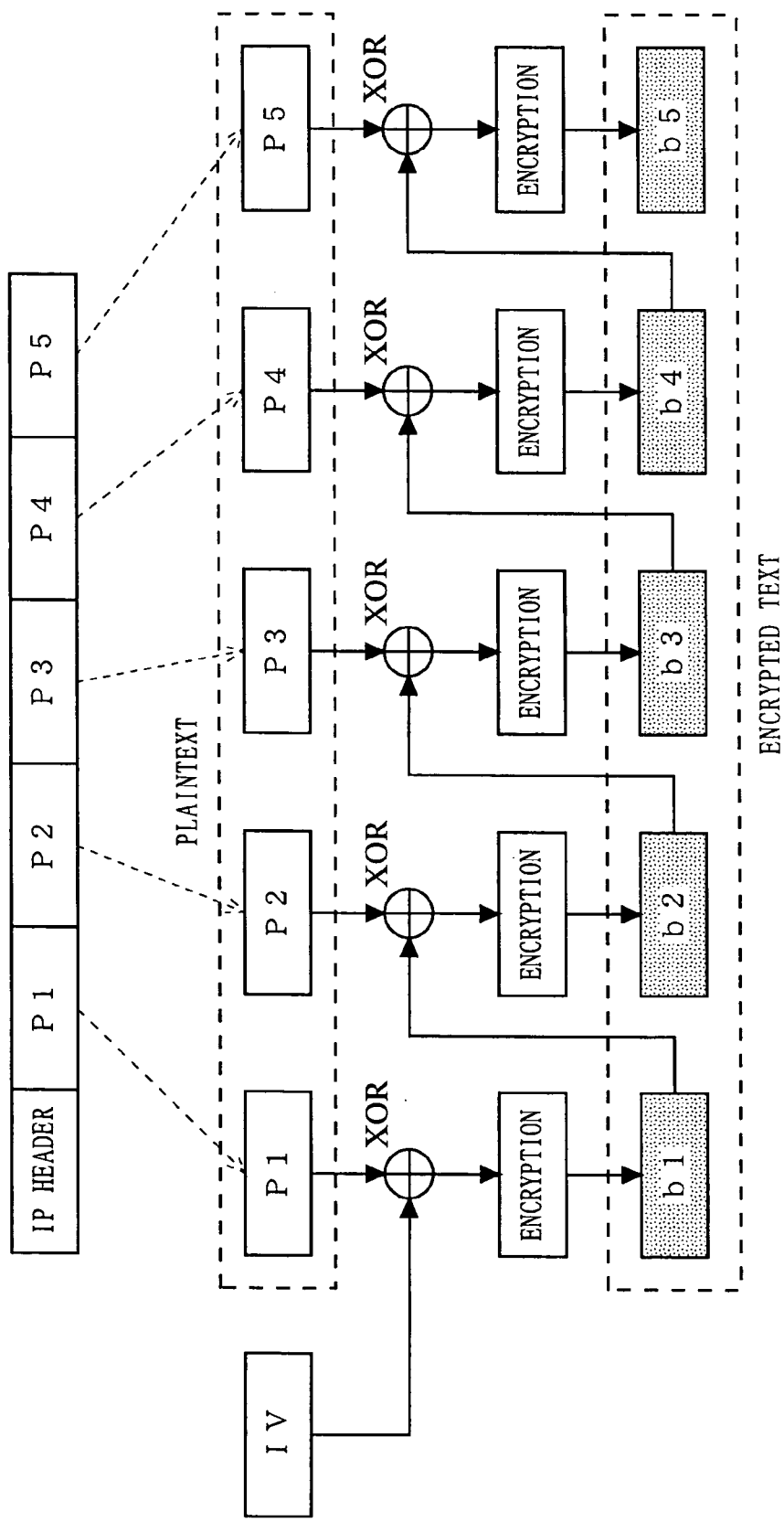
FIG. 10 is an illustration showing a packet encryption process by DES-CBC.
Figure 11:
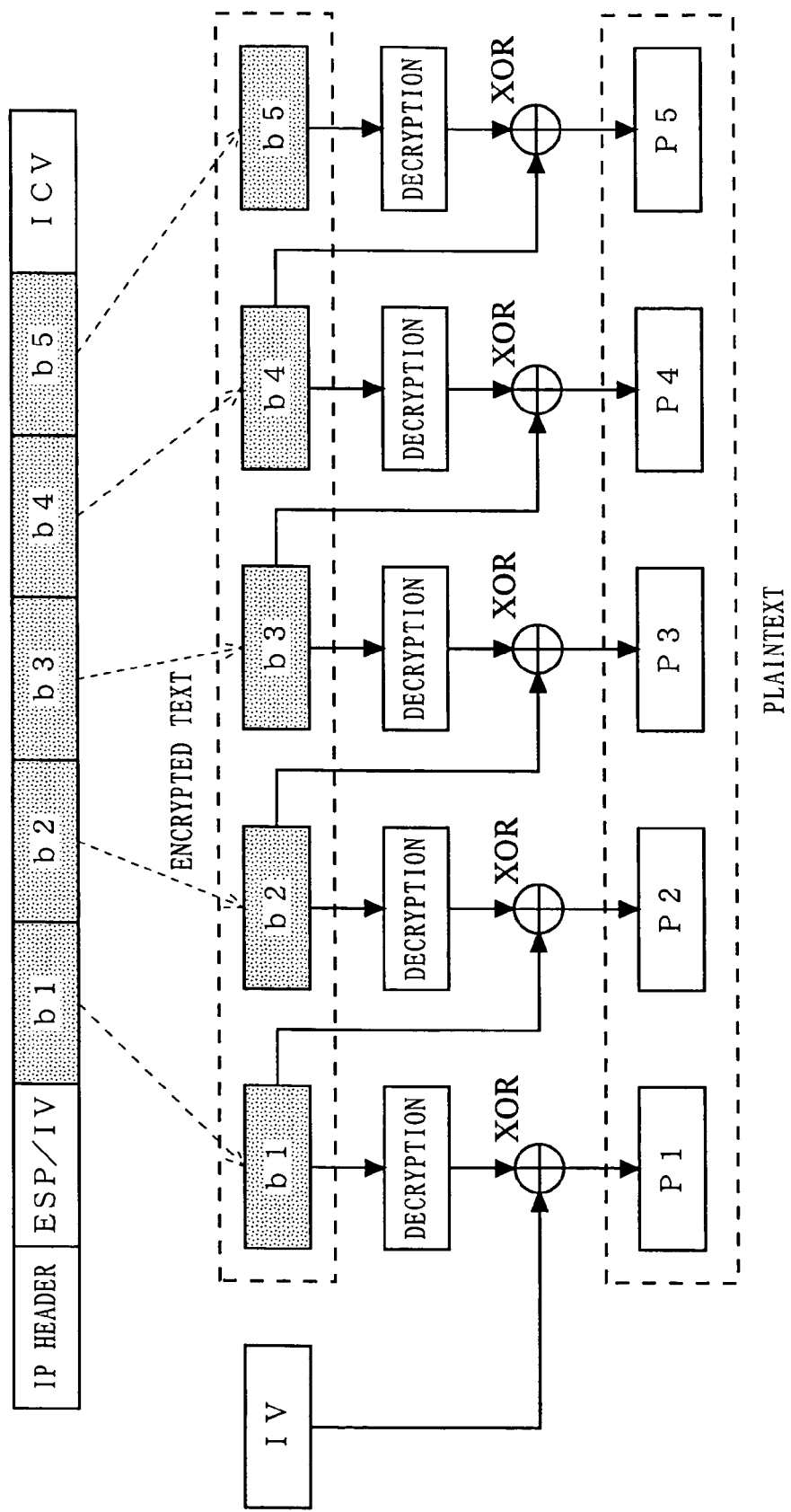
FIG. 11 is an illustration showing a packet decryption process by DES-CBC.

Here, the encryption algorithm "DES-CBC" is a method of encrypting and decrypting data of 8 bytes on a block basis (see RFC2405). As shown in FIG. 10, in an encryption process, the result of the XOR operation on a first block P1 of a plaintext and an IV is encrypted with the encryption key, thereby generating an encrypted first block b1. Hereinafter, an encrypted $n^{th}$ block bn (n is an integer equal to or greater than two) is generated by encrypting the result of XOR operation on an $n^{th}$ block Pn of a plaintext and the encrypted $(n-1)^{th}$ block b (n−1) with the encryption key. Also, as shown in FIG. 11, in a decryption process, the XOR operation is performed on the result of decryption of the encrypted first block b1, which is decrypted with the encryption key, using an IV, thereby restoring the first block P1 of the plaintext. Hereinafter, a $n^{th}$ block Pn of a plaintext is restored by performing XOR operation on the result of decryption of the encrypted $n^{th}$ block bn, which is decrypted with the encryption key, using the encrypted $(n-1)^{th}$ block b (n−1). As such, with the encryption algorithm "DES-CBC", it is possible to easily decrypt data on a block basis. Note that an encryption algorithm "3DES-CBC" differs from the encryption algorithm "DES-CBC" only in that data of 16-byte length is used as one block unit. Thus, also in this case, a location in which information necessary for the priority determination process is stored can be specified on a block basis. The above-described block specification will be described below.

The specified block decryption section 14 decrypts the block specified by the block specifying section 13, and extracts, from the decrypted data, information necessary for the priority level determination process by the priority level determination section 161 (step S904). Note that, in the case where the necessary information is not extracted by performing block specification and block decryption just one time (e.g., in the case where a next block to be decrypted is designated based on the result of decryption of the specified block), steps S903 and S904 are repeatedly performed until the necessary information is extracted (step S905).

Block specification performed by the block specifying section 13 and block decryption performed by the specified block decryption section 14, which are performed for extracting information necessary for the priority level determination process, will be described in detail.

First, the encrypted data area is divided into a plurality of blocks (a block b1, a block b2, . . . , a block bm) of 8 byte length from a head, based on a block unit of the encryption algorithm. Note that a variable m changes in accordance with a size of the encrypted data area, and the block bm indicates a last encrypted block. As described in FIG. 3, the layer 4 protocol type is stored in the next header field, which is a last one byte of the ESP trailer, according to IPsec specifications (see RFC2406). Thus, in this case, the layer 4 protocol type is included in the last block bm. As a result, the block bm is specified and decrypted, whereby the layer 4 protocol type is first extracted.

If the extracted layer 4 protocol type is TCP or UDP, the source port number and the destination port number are stored in the first two bytes and following two bytes of each header, according to TCP or UDP specifications (RFC793 and RFC768) (see FIGS. 4 and 5). Also, the layer 4 header is placed immediately after the IV according to IPsec specifications (see FIG. 16). Thus, the source port number and the destination port number are included in the first block b1. As a result, the block b1 is specified and decrypted, whereby the source port number and the destination port number are extracted from the first two bytes and the following two bytes.

As such, only the block b1 and the block bm are specified from among blocks by the block specifying section 13, and only the specified blocks are decrypted by the specified block decryption section 14, whereby it is possible to extract the layer 4 protocol type, the source port number, and the destination port number, which are necessary for the priority level determination process. The extracted information is output to the priority level determination section 161 along with the undecrypted original IPsec packet.

The priority level determination section 161 receives the layer 4 protocol type, the source port number, the destination port number, and the IPsec packet input from the specified block decryption section 14, and extracts the source IP address and the destination IP address from the IP header portion of the IPsec packet. The priority level determination section 161 searches the priority level information DB 162 using the source IP address, the destination IP address, the layer 4 protocol type, the source port number, and the destination port number as a key, thereby determining a priority level of the packet (step S906). In the case where the unencrypted IP packet is input from the encryption determination section 12, the priority level determination section 161 extracts all information as described above from the IP header and the layer 4 header of the IP packet, and determines a priority level of the packet based on the extraction results. For example, a priority level of the packet A1 (a source IP address "132.182.1.2", a destination IP address "132.182.2.2", a protocol type "UDP", a source port number "1000", and a destination port number "2000") is determined as "1" according to FIG. 8. A priority level of the packet A2 and A3 is determined as "2" according to FIG. 8. Note that the destination IP address is an IP address of the encrypted packet processing device 10, and therefore it may be omitted from the priority level information DB 162.

Figure 12:
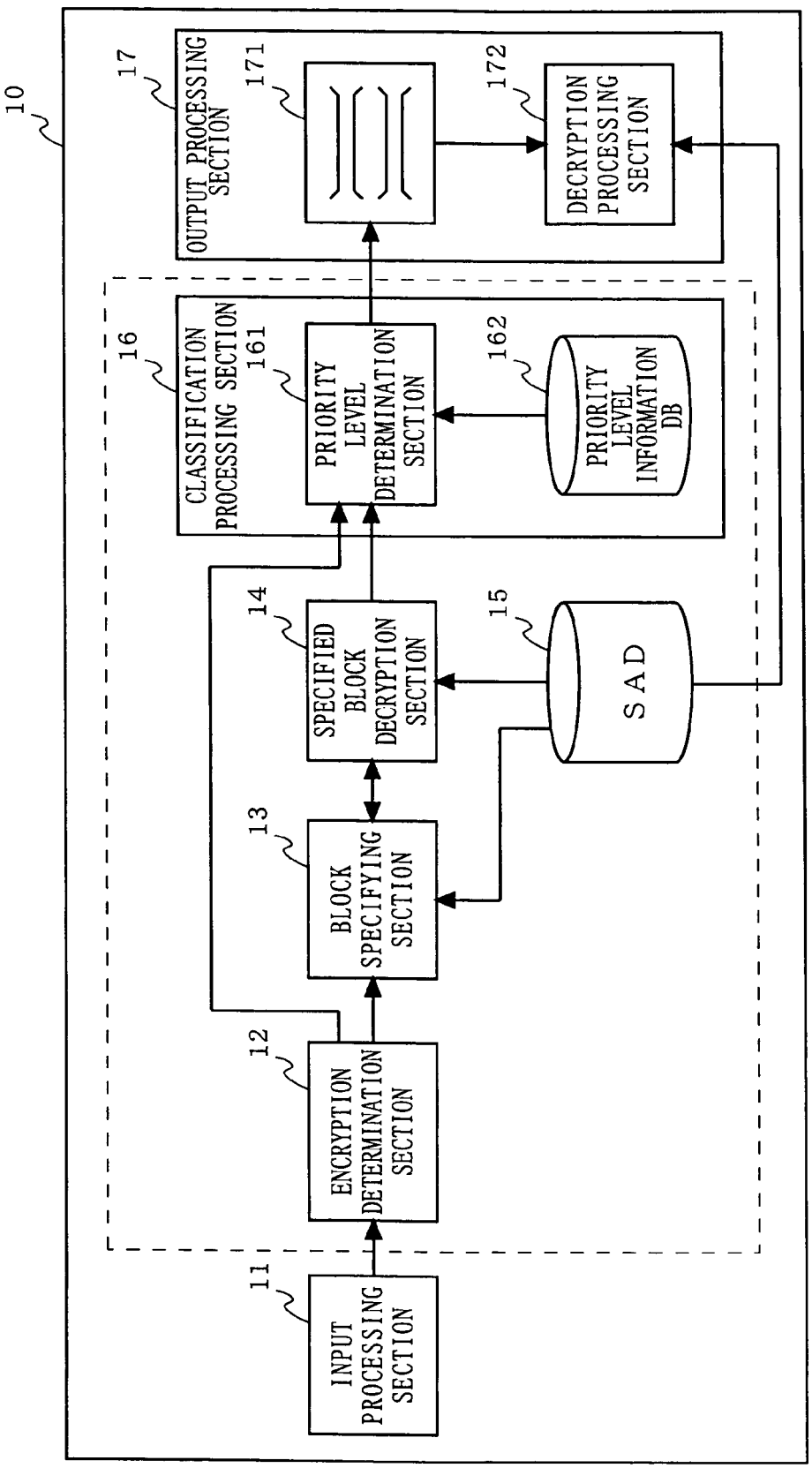
FIG. 12 is a block diagram showing one example of a specific structure of an output processing section of FIG. 6.

The output processing section 17 executes a predetermined output process in accordance with the priority level determined by the priority level determination section 161. For example, as shown in FIG. 12, the output processing section 17 is composed of a queue processing section 171, which is provided with a first queue corresponding to a priority level "1" and a second queue corresponding to a priority level "2", and a decryption processing section 172. With this structure, the queue processing section 171 is able to perform queuing such that the packet A1 is enqueued in the first queue and the packets A2 and A3 are enqueued in the second queue. The decryption processing section 172 performs a decryption process for the packet in the first queue preferentially over the packet in the second queue. Note that information of the security parameters necessary for packet decryption in the decryption processing section 172 may be obtained from the SAD 15 as shown in FIG. 12, or may be received from the priority level determination section 161 in conjunction with the packet. In the latter case, for example, pointer information indicating the SA corresponding to the packet, and information indicating the decrypted specific packet(s) and its block identifier can be attached to the end of the packet in a predetermined form. As a result, in the decryption processing section 172, it is possible to omit the decryption process which overlaps between the specified block decryption section 14 and the decryption processing section 172.

Also, for example, in place of the queue processing section 171, a table capable of sequentially storing a set of a priority level and a packet from a head of the area may be used. In this case, the decryption processing section 172 extracts one packet, which is provided with the highest priority level and is placed in a head of the area, registered in the table, and performs a decryption process.

Also, for example, the output processing section 17 may be composed of a distribution processing section for distributing a packet to another user terminal device, etc. In this case, the priority level information DB 162 and the priority level determination section 161 are respectively replaced with a distribution destination information DB, in which a set of specific information and a previously determined distribution destination is stored, and a distribution destination determining section for determining a distribution destination.

(2) Tunnel Mode IPsec

Basically, the same process is performed in tunnel mode and transport mode. However, the structure of the tunnel mode IPsec packet slightly differs from the structure of the transport mode IPsec packet. Hereinafter, the above-described different portion of the structure will be described.

Figure 13:
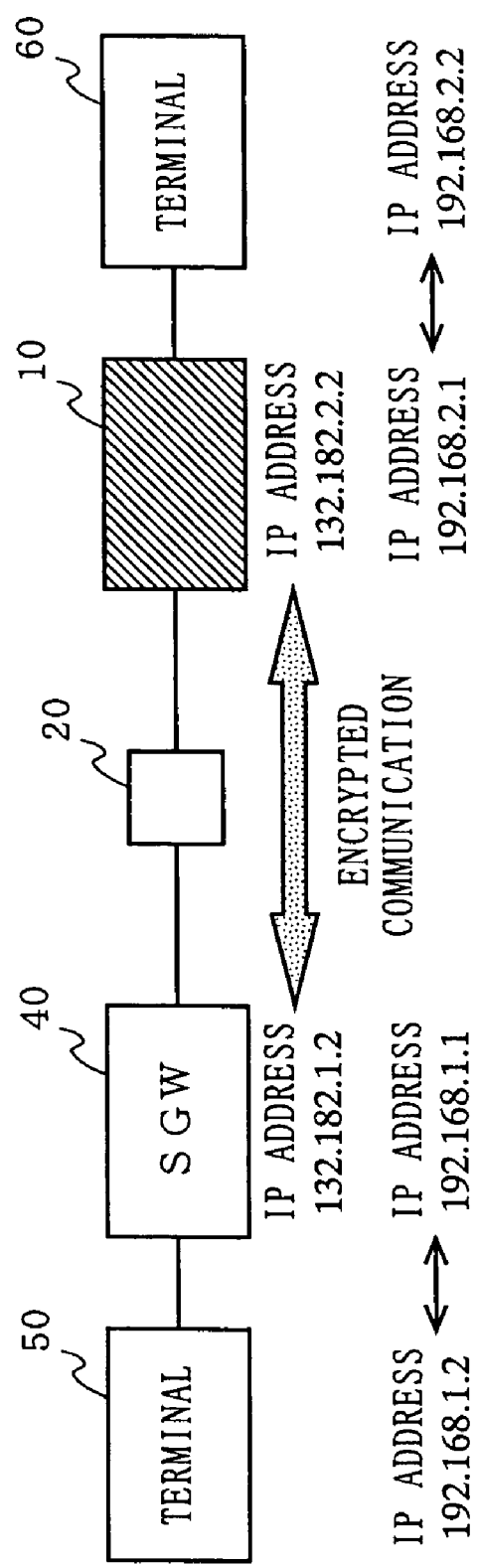
FIG. 13 is an exemplary network structure of an encrypted communication system (tunnel mode) including the encrypted packet processing device according to the first embodiment of the present invention.

FIG. 13 is an exemplary network structure of another encrypted communication system including the encrypted packet processing device according to the first embodiment of the present invention. In FIG. 13, the encrypted communication system includes the encrypted packet processing section 10, the network connecting device 20, a security gateway (SGW) 40, and terminals 50 and 60. The SGW 40 is a security gateway by which a packet transmitted from the terminal 50 is encrypted and the encrypted packet is transmitted to the terminal 60.

An SA is previously established between the encrypted packet processing device 10 and the SGW 40, and communication is performed using IPsec. Assume that the SA established between the encrypted packet processing device 10 and the SGW 40 includes the following information: a protocol "ESP", a mode "tunnel", an encryption algorithm "DES-CBC", and an authentication algorithm "HMAC-MD5". The SGW 40 has an IP address "192.168.1.1" for the LAN (terminal 50), and an IP address "132.182.1.2" for the WAN (network connecting device 20). Also, the encrypted packet processing device 10 has an IP address "192.168.2.1" for the LAN (terminal 60), and an IP address "132.182.2.2" for the WAN (network connecting device 20).

Figure 17:
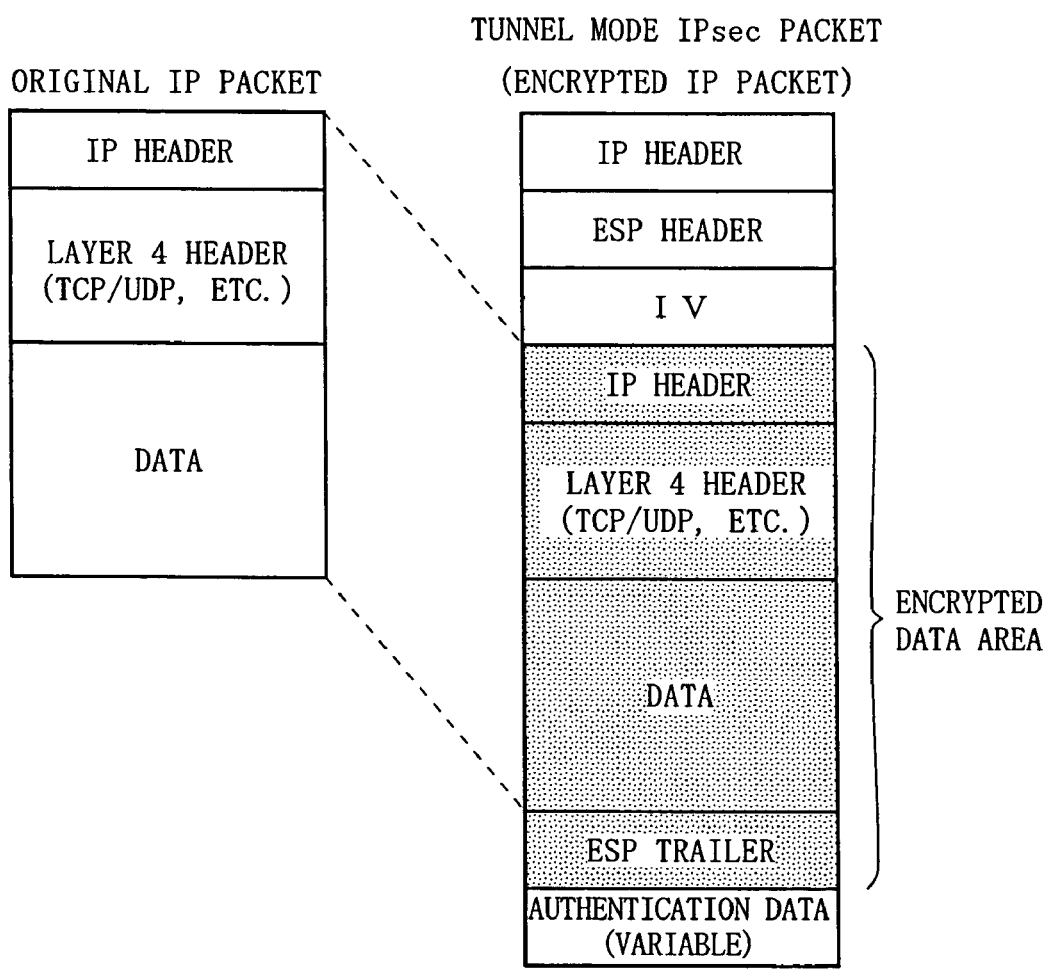
FIG. 17 is an illustration showing the structure of a tunnel mode IPsec packet.
Figure 18:
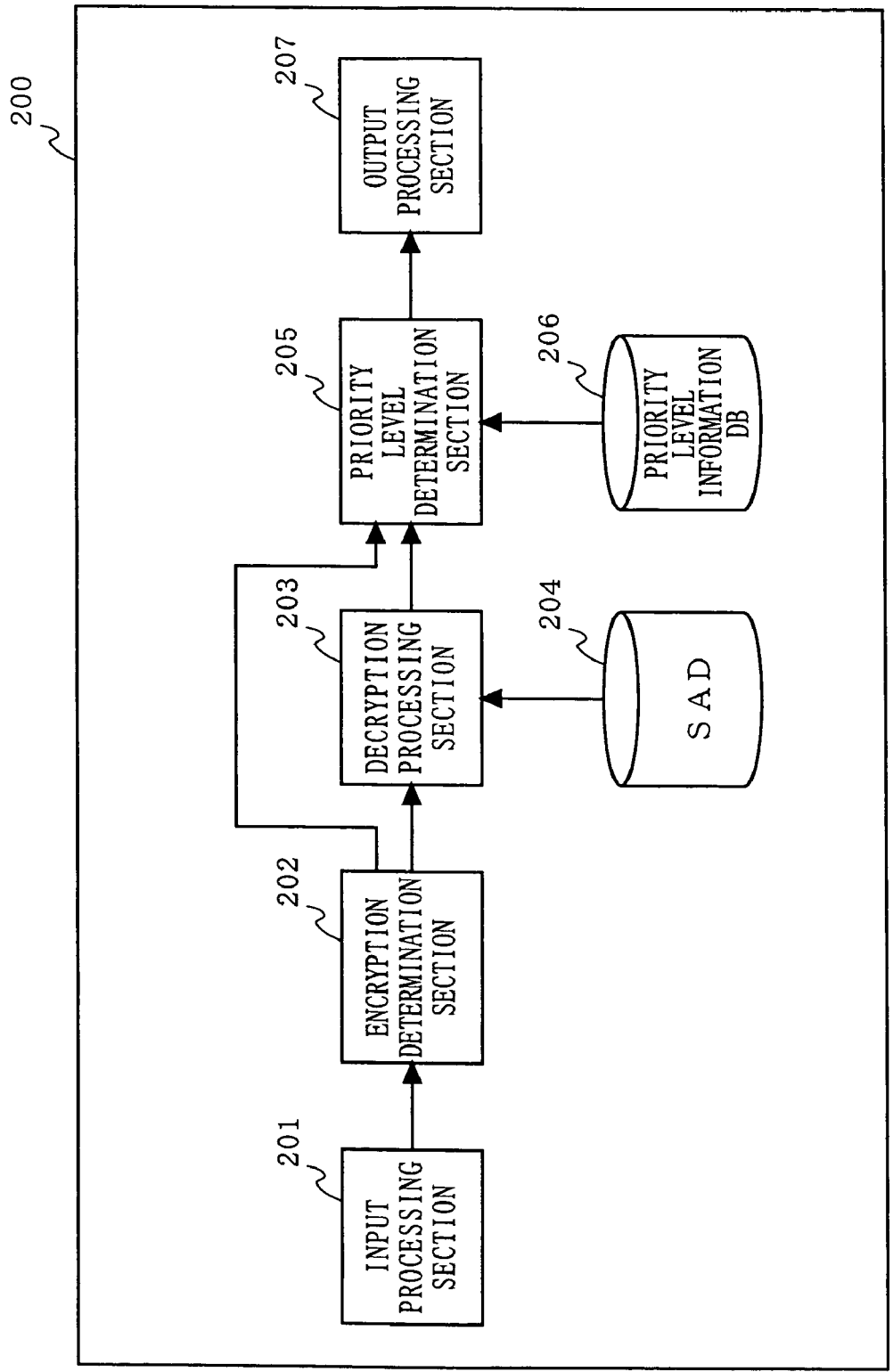
FIG. 18 is a block diagram showing an exemplary structure of a conventional processing device performing priority processing for packets.

The structure of the IPsec packet in ESP tunnel mode is shown in FIG. 17. This IPsec packet is composed of an IP header, an ESP header, an IV, an IP header, a layer 4 header, data, an ESP trailer, and authentication data. In tunnel mode, the entire portion of the original IP packet is encrypted. Thus, the source IP address, the destination IP address, and TOS stored in the IP header of the original IP packet, and the protocol header of the fourth or higher level layer included in the original IP packet may be used as specific information needed to be decrypted for priority level determination. The TOS is information indicating a service type of the IP packet, and can be used as specific information. Thus, in tunnel mode in which the entire portion of the IP packet is encrypted, a block including the TOS may be specified and decrypted.

A size of the IP header is variable. Thus, in tunnel mode, a start position of the higher layer protocol of the encapsulated IP packet is determined according to the size of the IP header, and a block including an IHL (a field indicating an IP header length) of the encapsulated IP header is specified and decrypted, thereby specifying a start position of the TCP protocol or the UDP protocol, which is a higher layer, by referring to the IHL value. As a result, it is possible to specify a block including the source port number and the destination port number included in the TCP protocol or the UDP protocol.

As such, in order to specify a location of a block including specific information, information such as a header length or a packet length necessary for identifying a location of a block including specific information may be used. As a result, a location of specific information can be specified even if such location changes from one packet to another.

One example of the priority level information DB 162 for the IPsec packet in ESP tunnel mode is shown in FIG. 14. As shown in FIG. 14, in the priority level information DB 162, inner IP header information is added to the registration items shown in FIG. 8. As is the case with the IP header information, the inner IP header information is composed of a source IP address and a destination IP address. Note that the inner IP header information may include other items in addition to the above-described items included in the IP header. Also, all items shown in FIG. 14 are not necessarily required. Thus, unnecessary items, if any, may be deleted from the table of FIG. 14.

In tunnel mode, according to IP specifications, the source IP address is stored in a portion from the thirteenth byte to the sixteenth byte of an IP header, and the destination IP address is stored in a portion from the seventeenth bite to the twentieth byte of the IP header. Thus, by decrypting the block b2 and the block b3, it is possible to obtain the source IP address and the destination IP address from the last four bytes of the block b2 and the first four bytes of the block b3. The layer 4 protocol type is stored in the tenth byte of the IP header. Thus, it is possible to obtain the layer 4 protocol type by decrypting the block b2 and referring to the second byte of the block b2. The layer 4 source port number and the layer 4 destination port number are stored in a portion from a head of the TCP (UDP) header to the eighth byte, as is the case with the transport mode. However, an IP header length is variable. Thus, it is necessary to obtain an IP header length first to specify a start position of a 4 layer header. The IP header length (IHL) is stored in the second byte of the IP header. Thus, it is possible to obtain the IP header length by decrypting the block b1 and referring to the second byte of the block b1. In this example, the IHL is 5 (=20 bytes), whereby it is determined that the source port number and the destination port number are stored in a portion from a head of the encrypted data area to the twenty-first to twenty-fourth byte. Thus, the block b3 is decrypted, whereby the source port number and the destination port number are obtained from the last four bytes of the block b3.

The priority level information DB 172 is searched using the IP header information, the inner IP header information, and the layer 4 information, which are obtained by the above-described block specifying process and block decryption process, as a key. As a result, it is possible to determine that a priority level of the above-described IPsec packet is "1".

As such, the encrypted packet processing device according to the first embodiment of the present invention specifies a location (block), in which specific information necessary for a classification process is stored, in an encrypted packet, and decrypts only data (block) in the specified location. As a result, it is possible to minimize the burden on a device performing the decryption process, thereby improving efficiency of priority processing and a distribution process to be performed in the following stage.

Note that, in the present embodiment, a case in which the header information of the layer 4 protocol is used as specific information has been described. However, specific information may be other information whose location can be specified based on a protocol header and header information, etc., of a fourth or higher level layer.

Also, in the present embodiment, a case in which an IPsec packet encrypted by an ESP protocol is input in conjunction with an unencrypted IP packet has been described. However, in the case where only the IPsec packet is input, the encryption determination section 12 may be omitted.

Also, in the present embodiment, in the case where the SAD 15 stores one encryption algorithm and one encryption key, the block specifying section 13 and the specified block decryption section 14 may perform a decryption process using the stored one encryption algorithm and one encryption key, without searching the SAD 15. Also, the encryption key may be a key manually registered by an administrator, or may be a key obtained by a key exchange program such as IKE. Also, in the present embodiment, a case in which the encryption algorithm is "DES-CBC" has been described. However, an encryption algorithm other than DES-CBC may be used as long as it is a block cipher requiring no other decrypted block in a block decryption process.

Further, in the present embodiment, priority level determination has been performed based on the protocol type and the source port number using an arbitrary destination port number as shown in the priority level information DB 162 of FIGS. 8 and 14. However, a method for priority level determination is not limited thereto. A priority level may be determined based on the protocol type and the destination port number using an arbitrary source port number, or may be determined based on the protocol type, the source port number, and the destination port number without using an arbitrary value.

(3) Security Protocol Other than IPsec

In the first embodiment, a case in which the method of the present invention is applied to an IPsec packet has been described. Next, in a second embodiment, a case in which the method of the present invention is applied to a packet encrypted by TLS_ver.1 defined in RFC2246 will be described. Note that the TLS encryption scheme defines a stream cipher and a block cipher. In the following descriptions, the block cipher will be described.

Figure 15:
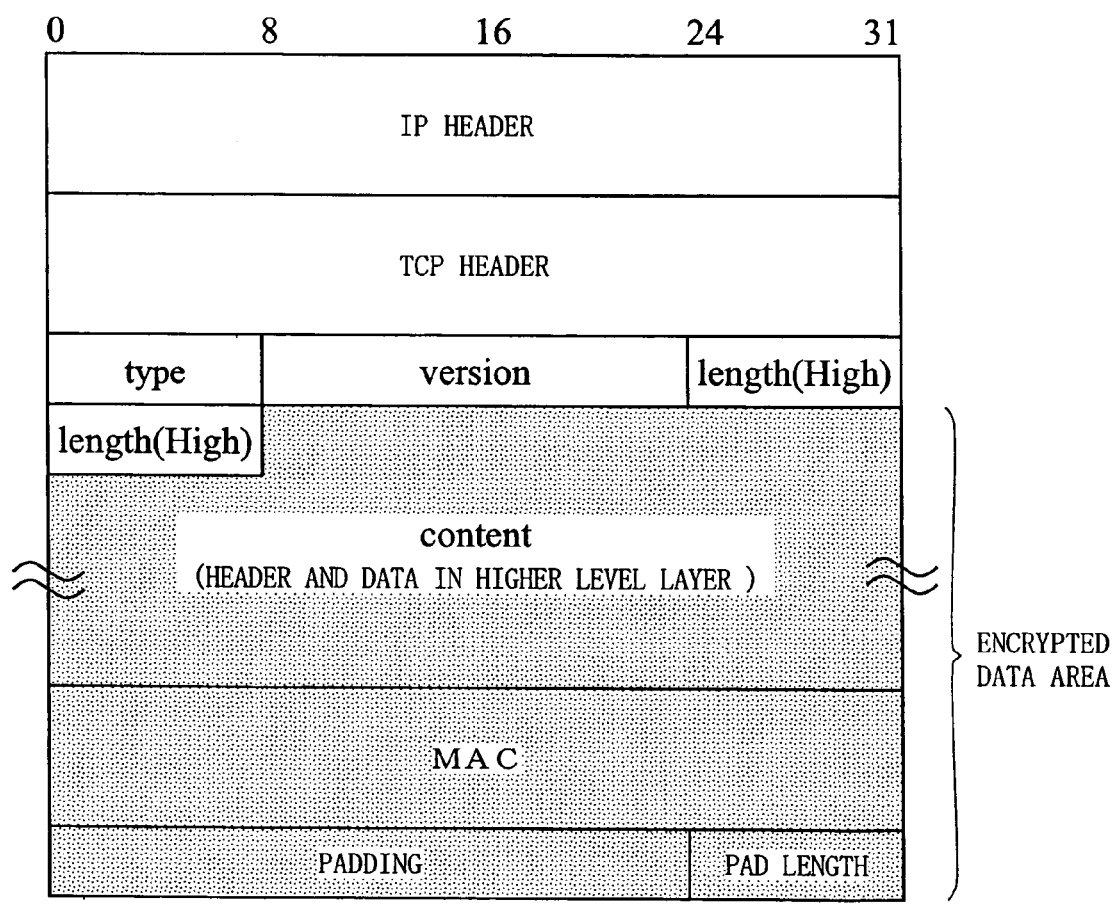
FIG. 15 is an illustration showing a format of a packet transmitted and received using a transport layer security (TLS) encryption scheme.

FIG. 15 is an illustration showing a packet format transmitted and received using the TLS encryption scheme. The IP header and the TCP header in FIG. 15 are the same as those shown in FIGS. 2 and 5, respectively. In FIG. 15, "type" indicates a protocol type in TLS, and 0x17 is set when application data is transmitted and received. Shaded area including "content" is an encrypted area. In the "content", a header and data used by the application are stored. MAC is a hash value obtained from the "content" by an algorithm used in this case. Padding is a field used for adjusting an encrypted area so as to become an integral multiple of a predetermined block. A pad length indicates a length of padding.

Thus, a priority level information DB corresponding to TLS at least includes a source IP address and a destination IP address as IP header information, a source port number and a destination port number as a layer 4 header information (TCP is always used by TLS), a field value to be noticed in the header used by the application, and a priority level. A block including the field value to be noticed is uniquely specified for each application, as is the case with IPsec.

Note that the block specifying section 13, the specified block decryption section 14, the SAD 15, and the classification processing section 16 are typically realized as an LSI (depending on a degree of integration, referred to as an IC, a system LSI, a super LSI, or an ultra LSI, etc.). The above functional blocks may be separately constructed in chip form, or may be constructed in chip form so that a portion or the entire portion thereof is included.

Also, a method of integration is not limited to LSI, and may be realized by a dedicated circuit or a general purpose processor. Also, an FPGA (Field Programmable Gate Array), which is an LSI that can be programmed after manufacture, or a reconfigurable processor enabling connections and settings of the circuit cells in the LSI to be reconfigurated may be used.

Further, in the case where another integration technology replacing LSI becomes available due to improvement of a semiconductor technology or due to the emergence of another technology derived therefrom, integration of the functional blocks may be performed using the above new integration technology. For example, biotechnology may be applied to the above-described integration.

Also, the encrypted packet processing method of the present invention may be realized by a CPU performing interpretation execution for predetermined program data, which is stored in a storage device (a ROM, a RAM, and a hard disk, etc.), and is executable in the above-described procedure. In this case, the program data may be installed onto the storage device via a recording medium such as a CD-ROM and a flexible disk, or may be executed directly from the recording medium.

While the invention has been described in detail, the foregoing description is in all aspects illustrative and not restrictive. It is understood that numerous other modifications and variations can be devised without departing from the scope of the invention.

What is claimed is:

1. An encrypted packet processing device for classifying packet data of an input packet as one of real-time data and non-real-time data, wherein at least a portion of the packet data is encrypted sequentially on a block basis, said encrypted packet processing device comprising:

a block specifying section for specifying only at least one of an encrypted first block and an encrypted last block in an encrypted data area of the input packet, wherein the encrypted first and last blocks include specific information necessary for classifying the packet data;

a specified block decryption section for decrypting only the at least one of the encrypted first block and the encrypted last block specified by the block specifying section;

a classification processing section for classifying the packet data by determining a priority level of the input packet based on the specific information included in the at least one of the encrypted first block and the encrypted last block decrypted by the specified block decryption section, wherein the classification processing section includes:

a priority level information database for storing information about a correspondence between specific information and priority levels, and a priority level determination section for determining the priority level of the input packet based on the specific information included in the at least one of the decrypted first block and the decrypted last block and the information stored in the priority level information database;

a plurality of queues, each of which has a uniquely corresponding priority level; and a decryption processing section for sequentially retrieving a packet from the plurality of queues and performing a decryption process based on a predetermined rule, wherein the priority level determination section enqueues the input packet in the queue corresponding to the priority level; and at least one of the block specifying section, specified block decryption section, and classification processing section is hardware.

2. The encrypted packet processing device according to claim 1, wherein the block specifying section further specifies the at least one of the encrypted first block and the encrypted last block based on information included in an unencrypted block of the input packet.

3. The encrypted packet processing device according to claim 1, wherein the block specifying section further specifies the encrypted last block which includes information for specifying the encrypted first block, wherein the encrypted first block includes specific information necessary for classifying the packet data, and specifies the encrypted first block based on the information included in the last block decrypted by the specified block decryption section.

4. The encrypted packet processing device according to claim 1, further comprising a database for storing information about a correspondence between encryption applicable to a packet and the at least one of the encrypted first block and the encrypted last block, wherein the block specifying section further specifies the at least one of the encrypted first block and the encrypted last block based on encryption applied to the input packet and the information stored in the database.

5. The encrypted packet processing device according to claim 1, wherein:

the priority level determination section enqueues the input packet and the at least one of the decrypted first block and the decrypted last block by the specified block decryption section in the queue corresponding to the priority level; and the decryption processing section performs a decryption process for a block, which is included in the input packet, other than the at least one of the decrypted first block and the decrypted last block.

6. The encrypted packet processing device according to claim 2, wherein:

the input packet is a packet encrypted in accordance with an internet protocol security protocol; and the information included in the unencrypted block is at least a protocol number included in an internet protocol header.

7. The encrypted packet processing device according to claim 3, wherein:

the input packet is a packet encrypted in accordance with an internet protocol security protocol; and the information for specifying the at least one of the encrypted first block and the encrypted last block including the specific information is at least one of an internet protocol header length, a service type, and a protocol number.

8. The encrypted packet processing device according to claim 3, wherein:

the input packet is an encapsulating security payload transport mode packet encrypted in accordance with an internet protocol security protocol; and the specific information necessary for classifying the packet data is at least one of a next header included in an encapsulating security payload trailer, a source port number included in a layer 4 header, and a destination port number included in the layer 4 header.

9. The encrypted packet processing device according to claim 3, wherein:

the input packet is an encapsulating security payload tunnel mode packet encrypted in accordance with an internet protocol security protocol; and the specific information necessary for classifying the packet data is at least one of a source internet protocol address, a destination internet protocol address, and a service type, which are included in an encapsulated internet protocol header.

10. The encrypted packet processing device according to claim 3, wherein:

the input packet is an encapsulating security payload tunnel mode packet encrypted in accordance with an internet protocol security protocol; and the specific information necessary for classifying the packet data is at least one of a protocol number included in an capsulated internet protocol header, a source port number included in a layer 4 header, and a destination port number included in the layer 4 header.

11. The encrypted packet processing device according to claim 4, wherein:

the input packet is a packet encrypted in accordance with an internet protocol security protocol; and the database is a security association database storing security parameters including an encryption key.

12. The encrypted packet processing device according to claim 7, wherein the internet protocol header length, the service type, and the protocol number are each included in an internet protocol header.

13. An encrypted packet processing method for classifying packet data as one of real-time data and non-real-time data for an input packet including at least a portion of the packet data encrypted sequentially on a block basis, said method comprising:

specifying only at least one of an encrypted first block and an encrypted last block in an encrypted data area of the input packet, wherein the encrypted first and last blocks include specific information necessary for classifying the packet data;

decrypting only the at least one of the encrypted first block and the encrypted last block specified in said specifying operation; and classifying the packet data by determining a priority level of the input packet based on the specific information included in the at least one of the encrypted first block and the encrypted last block decrypted in said decrypting operation, wherein said classifying includes:

storing, in a priority level information database, information about a correspondence between specific information and priority levels, and determining, with a priority level determination section, the priority level of the input packet based on the specific information included in the at least one of the decrypted first block and the decrypted last block and the information stored in the priority level information database;

sequentially retrieving, with a decryption processing section, a packet from a plurality of queues, each of which has a uniquely corresponding priority level, and performing, with the decryption processing section, a decryption process based on a predetermined rule, wherein the priority level determination section enqueues the input packet in the queue corresponding to the priority level.

14. A non-transitory computer-readable recording medium storing a computer-readable program for causing a computer to execute a method for classifying packet data as one of real-time data and non-real-time data for an input packet including at least a portion of the packet data encrypted sequentially on a block basis, said method comprising:

specifying only at least one of an encrypted first block and an encrypted last block in an encrypted data area of the input packet, wherein the encrypted first and last blocks include specific information necessary for classifying the packet data;

decrypting only the at least one of the encrypted first block and the encrypted last block specified in said specifying operation; and classifying the packet data by determining a priority level of the input packet based on the specific information included in the at least one of the encrypted first block and the encrypted last block decrypted in said decrypting operation, wherein said classifying includes:

storing, in a priority level information database, information about a correspondence between specific information and priority levels, and determining, with a priority level determination section, the priority level of the input packet based on the specific information included in the at least one of the decrypted first block and the decrypted last block and the information stored in the priority level information database;

sequentially retrieving, with a decryption processing section, a packet from a plurality of queues, each of which has a uniquely corresponding priority level, and performing, with the decryption processing section, a decryption process based on a predetermined rule, wherein the priority level determination section enqueues the input packet in the queue corresponding to the priority level.

15. An integrated circuit for classifying packet data as one of real-time data and non-real-time data for an input packet including at least a portion of the packet data encrypted sequentially on a block basis, said integrated circuit comprising:

a block specifying section for specifying only at least one of an encrypted first block and an encrypted last block in an encrypted data area of the input packet, wherein the encrypted first and last blocks include specific information necessary for classifying the packet data;

a specified block decryption section for decrypting only the at least one of the encrypted first block and the encrypted last block specified by the block specifying section;

a classification processing section for classifying the packet data by determining a priority level of the input packet based on the specific information included in the at least one of the encrypted first block and the encrypted last block decrypted by the specified block decryption section, wherein the classification processing section includes:

a priority level information database for storing information about a correspondence between specific information and priority levels, and a priority level determination section for searching the priority level information database by using the specific information included in the at least one of the decrypted first block and the decrypted last block as a key and for determining the priority level of the input packet based on the searched information stored in the priority level information database;

a plurality of queues, each of which has a uniquely corresponding priority level; and a decryption processing section for sequentially retrieving a packet from the plurality of queues and performing a decryption process based on a predetermined rule, wherein the priority level determination section enqueues the input packet in the queue corresponding to the priority level;

wherein at least one of the block specifying section, specified block decryption section, classification processing section, and priority level information database is hardware.

* * * * *